(12) United States Patent
L'Allier et al.

(10) Patent No.: US 12,195,171 B2
(45) Date of Patent: Jan. 14, 2025

(54) AIRCRAFT HYDRAULIC ACTUATION SYSTEM WITH CHAMBERS FOR HYDRAULIC FLUID

(71) Applicant: AIRBUS OPERATIONS LIMITED, Bristol (GB)

(72) Inventors: Paul L'Allier, Bristol (GB); Andy Mounty, Bristol (GB); Sean Kerr, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 503 days.

(21) Appl. No.: 17/604,272

(22) PCT Filed: Aug. 25, 2020

(86) PCT No.: PCT/EP2020/073709
§ 371 (c)(1),
(2) Date: Oct. 15, 2021

(87) PCT Pub. No.: WO2021/037829
PCT Pub. Date: Mar. 4, 2021

(65) Prior Publication Data
US 2022/0194564 A1  Jun. 23, 2022

(30) Foreign Application Priority Data
Aug. 30, 2019  (GB) ..................................... 1912511

(51) Int. Cl.
*B64C 25/22* (2006.01)
*B64C 25/16* (2006.01)
(Continued)

(52) U.S. Cl.
CPC .............. *B64C 25/22* (2013.01); *B64C 25/16* (2013.01); *F15B 11/024* (2013.01);
(Continued)

(58) Field of Classification Search
CPC ................................ B64C 25/22; B64C 13/40
See application file for complete search history.

(56) References Cited

U.S. PATENT DOCUMENTS

| 4,349,041 A | * | 9/1982 | Bates | ....................... E21B 34/16 |
| | | | | 251/1.2 |
| 6,120,009 A | * | 9/2000 | Gatehouse | .............. B64C 25/60 |
| | | | | 267/64.11 |

(Continued)

FOREIGN PATENT DOCUMENTS

| DE | 10 2017 003 153 | 5/2018 |
| DE | 10 2017 112 451 | 12/2018 |

(Continued)

OTHER PUBLICATIONS

International Search Report and Written Opinion of the ISA for PCT/EP2020/073709 dated Jan. 14, 2021, 14 pages.
EP 20 785 675.8, Examination Report ( Aug. 10, 2023) (8 pages).

*Primary Examiner* — Joshua J Michener
*Assistant Examiner* — Arfan Y. Sinaki
(74) *Attorney, Agent, or Firm* — Nixon & Vanderhye P.C.

(57) ABSTRACT

An aircraft hydraulic actuation system for retracting an aircraft landing gear. The actuation system includes a supply line arranged to carry hydraulic fluid pressurised by a pump, a return line arranged to return hydraulic fluid to a reservoir, and a hydraulic actuator 128. In a first mode of operation, a first chamber 130 of the actuator 128 is supplied with pressurised hydraulic fluid from the supply line such that a piston 134 is moved in a first direction so as to move a load such as a landing gear. In a second mode of operation, the first chamber 130 is taken out of fluid communication with the supply line and a second chamber 132 is in fluid communication with the return line, such that the piston 134

(Continued)

is able to be moved under the influence of the load, for example when the landing gear extends under gravity.

18 Claims, 7 Drawing Sheets

(51) Int. Cl.
*F15B 11/024* (2006.01)
*F15B 13/02* (2006.01)
*F15B 15/18* (2006.01)

(52) U.S. Cl.
CPC ............ *F15B 13/021* (2013.01); *F15B 15/18* (2013.01); *F15B 2211/20523* (2013.01); *F15B 2211/7053* (2013.01)

(56) References Cited

U.S. PATENT DOCUMENTS

| | | | |
|---|---|---|---|
| 10,066,650 B2 * | 9/2018 | Tanaka | ................. F15B 15/1423 |
| 2009/0095839 A1 * | 4/2009 | Lassus | .................... B64C 25/60 244/102 R |
| 2010/0264265 A1 | 10/2010 | Evans | |
| 2013/0068885 A1 * | 3/2013 | Onomichi | ........... F15B 21/0427 244/102 R |
| 2013/0119196 A1 * | 5/2013 | Lindahl | .................... B64C 25/22 244/100 R |
| 2016/0208824 A1 * | 7/2016 | Hare | ......................... F15B 1/08 |
| 2016/0348701 A1 * | 12/2016 | Marles | .................... B64C 25/22 |
| 2017/0088256 A1 | 3/2017 | Kondo et al. | |
| 2018/0339766 A1 | 11/2018 | Didey et al. | |
| 2019/0072114 A1 * | 3/2019 | Myers | ..................... F15B 15/06 |
| 2019/0315456 A1 * | 10/2019 | Fox | ......................... B64C 13/40 |

FOREIGN PATENT DOCUMENTS

| | | | | |
|---|---|---|---|---|
| EP | 2792890 A1 * | 10/2014 | ............ | F15B 15/224 |
| EP | 3561313 | 10/2019 | | |
| GB | 449876 | 7/1936 | | |

* cited by examiner

AIRCRAFT HYDRAULIC ACTUATION SYSTEM WITH CHAMBERS FOR HYDRAULIC FLUID

RELATED APPLICATION

This application is the U.S. national phase of International Application PCT/EP2020/073709 filed Aug. 25, 2020, which designated the U.S. and claims priority to United Kingdom patent application GB 1912511.1, filed Aug. 30, 2019, the entire contents of each of which are hereby incorporated by reference.

TECHNICAL FIELD

The present invention concerns a hydraulic actuation system for use in an aircraft. More particularly, but not exclusively, this invention concerns an aircraft hydraulic actuation system for retracing an aircraft landing gear.

BACKGROUND OF THE INVENTION

Aircraft, in particular commercial aircraft, typically comprise a hydraulic actuation system to extend and retract their landing gear. FIG. 1 shows an aircraft 2 comprising a landing gear 14. FIG. 2 is a schematic drawing showing an example arrangement for extending and retracting (i.e. lowering and raising) the landing gear 14. The landing gear 14 comprises a landing gear leg 4 and pair of wheels 6. A double acting hydraulic actuator 10 is connected between a structure within the aircraft fuselage 12 and the landing gear leg 4. To retract the landing gear 14 (e.g. after take-off), the actuator 10 is operated so as to reduce in length and pull the landing gear 14 about pivot 8 until the landing gear 14 becomes fully contained with fuselage. To extend the landing gear 14 (e.g. for landing), the actuator 10 is operated so as to extend in length. On extension, the landing gear 14 moves both under its own weight and under the force of the actuator 10.

FIGS. 3a and 3b show the actuator 10 and its associated hydraulic connections in more detail. The actuator 10 comprises a housing 24 containing a first chamber 16 and a second chamber 18 separated by a piston 20 connected to a piston rod 22. The actuator 10 is reduced in length (FIG. 3a) by supplying pressurised hydraulic fluid into the first chamber 16, and allowing hydraulic fluid to exit the second chamber 18. The piston 20 thereby moves to the left (in the orientation shown in the figure) and the piston rod 22 is retracted into the housing 24. The actuator 10 is extended in length (FIG. 3b) by supplying pressurised hydraulic fluid into the second chamber 18, and allowing hydraulic fluid to exit the first chamber 16. The piston 20 thereby moves to the right (in the orientation shown in the figure) and the piston rod 22 is extended further out of the housing 24.

Aircraft landing gear may have a considerable weight, therefore relatively powerful actuators may be required to retract the landing gear. However, when the landing gear is extended, there may be very few forces opposing the action of the actuator. Particularly at the point when the landing gear has reached its fully extended position, large forces may be transmitted into the aircraft and landing gear structure by the actuator. The structures and attachment points must therefore be sufficiently strong to withstand all the forces that may be applied to them by the actuator at this point. This may add to the overall weight associated with the landing gear.

FIGS. 4a and 4b shows an alternative prior art arrangement of the actuator 10 and its hydraulic connections. The alternative arrangement comprises a flow restrictor 26 on the hydraulic line that supplies the second chamber 18 of the actuator 10. The flow restrictor 26 has the effect of reducing the pressure of the hydraulic fluid supplied into the second chamber 18 when the landing gear 12 is extended (FIG. 4b). The level of flow restriction is selected such that the flow of hydraulic fluid into the second chamber 18 is insufficient to "keep up" with the extension of the actuator as the landing gear drops under gravity. Due to the weight of the landing gear 12 and restriction to the flow of fluid into the second chamber 18, the pressure in the second chamber 18 is driven towards a vacuum. This has the advantage that, when the landing gear has reached its fully extended position, the load generated by the actuator 10 into the structure is significantly reduced. A check valve 28 is provided in parallel to the flow restrictor 26 to allow hydraulic fluid to freely flow out of the second chamber 18 when the landing gear 12 is retracted (FIG. 4a).

A disadvantage of the above mentioned arrangement is that the orifice of the flow restrictor 26 may need to be very small and therefore the risk of clogging is increased. Additionally, the flow rate through the flow restrictor 26, which may need to be very low, may vary with valve wear and fluid temperature. The flow restrictor 26 may therefore not reliably restrict flow sufficiently in all cases, and as a consequence, large and undesirable loads may occur at the end of extension, which could be difficult to detect.

The present invention seeks to mitigate one or more of the above-mentioned problems. Alternatively or additionally, the present invention seeks to provide an improved hydraulic actuation system for an aircraft landing gear.

SUMMARY OF THE INVENTION

The present invention provides, according to a first aspect, an aircraft hydraulic actuation system comprising: a supply line arranged to carry hydraulic fluid pressurised by a pump, a return line arranged to return hydraulic fluid to a reservoir, and a hydraulic actuator comprising a first chamber and a second chamber separated by a piston; wherein the aircraft hydraulic actuation system has a first mode of operation in which the first chamber is supplied with pressurised hydraulic fluid from the supply line such that the piston is moved in a first direction so as to move a load; and wherein the aircraft hydraulic actuation system has a second mode of operation in which the first chamber is taken out of fluid communication with the supply line and the second chamber is in fluid communication with the return line, such that the piston is able to be moved in a second direction, opposite to the first direction, under the influence of the load.

As compared to the prior art hydraulic actuation systems described with reference to FIGS. 3a/3b and 4a/4b, the hydraulic actuation system of the present invention has an operating mode in which neither chamber of the actuator is supplied, either directly or via a flow restrictor, by pressurised hydraulic fluid from the supply line. This may reduce the possibility of pressurised hydraulic fluid entering the second chamber and inadvertently causing the actuator to exert a correspondingly large force. Therefore there may be a reduced need to strengthen the structure and attachment points associated with the actuator. Accordingly a weight saving may be achieved.

The hydraulic actuator of the present invention may be able to provide a working force in only one direction, that is, when the system is configured in the first mode. The present invention may therefore have particular application in actuating aircraft components which are driven in one direction by an external force, and therefore are only required to be moved by an actuator in the opposite direction (i.e. the return direction). A landing gear may be an example of such a component. The landing gear may be capable of extending under external forces such as gravity and/or aerodynamic forces, preferably reaching full extension under such external forces alone. Hence, it may only be necessary for an actuator to be used to retract (lift) the landing gear. An aircraft door, in particular a landing gear door, may be another example of such a component. The aircraft door may move in one direction (e.g. towards an open position) due to a pressure differential between the aircraft cabin/landing gear bay and the outside, aerodynamic forces acting on the door (e.g. due to airflow over the door—whether those forces tend to open or close the door may depend on the orientation and design of the door) and/or gravity. Hence, an actuator may only be required to move the door back (e.g. to shut the door).

The hydraulic actuation system may comprise a hydraulic fluid flow path between the first chamber and the second chamber. The flow path may allow the second chamber to be filled by hydraulic fluid from the first chamber, for example during the second mode of operation. Such a flow path may be required if the second chamber cannot be filled by hydraulic fluid from the return line, for example due to the presence of a check valve in the return line. Such a check valve may be present to ensure one way flow to the reservoir.

The flow path between the first and second chambers may be external to the actuator or integral with the actuator. The flow path may be between two hydraulic lines which feed into the first and second chambers respectively. The hydraulic actuator may comprise internal hydraulic lines each arranged to connect to an external hydraulic line and carry hydraulic fluid from the point of connection to a chamber. The flow path may be between two such internal hydraulic lines. The flow path may directly connect the first and the second chambers. The flow path may be provided within the piston of the actuator. The flow path may be provided between the piston and an internal wall of the actuator housing. The flow path may restrict the rate of fluid flow to a predetermined level. The flow path may comprise a flow restrictor arranged to restrict the rate of fluid flow. The flow restrictor may be a fixed orifice valve.

The flow path may be permanently open. The flow path is preferably arranged such that the flow rate does not have a substantive effect on the operation of the actuator in the first mode of operation. In other words, the flow rate is preferably low enough that the rate at which hydraulic fluid may leak from the supply line to the return line during the first mode of operation does not have an adverse effect on the operation of the actuator.

The flow path may be closable. For example, there may be a valve arranged to selectively close the flow path. The flow path may be closed during the first mode of operation. The flow path may be open during the second mode of operation. The valve may be electronically controlled, for example by a control unit of the aircraft. The valve may be mechanically and/or hydraulically controlled, for example by being actuated in response to hydraulic pressure when the supply line is in fluid communication with the first chamber.

The pump may be arranged to pressurize hydraulic fluid to a supply pressure (i.e. a working pressure). The supply pressure may be sufficient for the operation of components such as flight control surfaces (e.g. slats, flaps, stabilizers, elevators, etc.), brakes, landing gear retraction actuators, and the like. The supply line may be arranged to supply hydraulic fluid at the supply pressure. The supply line may be arranged to carry the pressurised hydraulic fluid directly from the pump, or indirectly from the pump via one or more components, lines, valves, accumulators, filters and/or the like. The supply pressure may be 100 Bar or greater, 150 Bar or greater, or 200 Bar or greater. The supply pressure may be greater than the pressure in the return line, for example five time greater or ten times greater than the pressure in the return line. The pump may be an engine driven pump. The pump may be an electric pump. The pump may be a mechanical pump, for example a pump powered by another hydraulic circuit. A plurality of pumps may be provided, at least one of the pumps may be provided as a backup in case of failure of a primary pump.

The return line may be arranged to return hydraulic fluid directly to the reservoir, or indirectly to the reservoir via one or more components, lines, valves, accumulators, filters and/or the like. The hydraulic actuation system may be arranged such that the pressure of hydraulic fluid in the return line is 20 Bar or less, 10 Bar or less, or 5 Bar or less. The reservoir may be arranged to supply hydraulic fluid to the pump.

There may be a first hydraulic line arranged to deliver fluid into, and receive fluid from, the first chamber. There may be a second hydraulic line arranged to deliver fluid into, and receive fluid from, the second chamber. The first line and/or the second line may each be selectively connectable (e.g. via a valve arrangement such as one or more selector valves) to the supply line and/or the return line. In the first mode, the second chamber may be in fluid communication with the return line. It may be that the second chamber is permanently connected to the return line. In the second mode, the first chamber may be in fluid communication with the return line.

The hydraulic actuator may comprise two opposing ends. The hydraulic actuator may be pivotally mountable at either or both of its ends. The piston may be connected to a piston rod. The piston rod may be pivotally mountable at its free end. The hydraulic actuator may be mounted, for example pivotally mounted, at a first end to a fixed aircraft structure (e.g. to a fixed component within the fuselage or wing). The hydraulic actuator may be mounted, for example pivotally mounted, at a second end to a landing gear.

The hydraulic actuator may be arranged such that in the first mode of operation the piston is urged in the first direction so as to extend the overall length of the actuator. In the second mode of operation the piston may be able to be moved in the second direction so as to reduce the overall length of the actuator. Alternatively, the hydraulic actuator may be arranged such that in the first mode of operation the piston is urged in the first direction so as to reduce the overall length of the actuator. In the second mode of operation the piston may be able to be moved in the second direction so as to extend the overall length of the actuator.

The present invention may provide, according to a second aspect, an aircraft comprising a hydraulic actuation system according to the first aspect of the invention. The load movable by the actuator may be an aircraft component. The component may be a component which, at some point during its use, is moved (i.e. by an external force not created by the actuator) in a direction that would cause the piston to move in the second direction. For example, the component may be an aircraft landing gear that is arranged such that it may extend under gravity and/or under the action of aerodynamic forces. The component may be an aircraft door that is arranged so as to open and/or close under external forces, such as those forces created by a pressure differential on either side of the door.

The landing gear may be a nose landing gear. The landing gear may be a main landing gear. The landing gear may comprise a shock absorber strut (i.e. an oleo strut). The landing gear may comprise a wheel, preferably a pair of wheels, mounted to the shock absorber strut. The landing gear may comprise a bogie attached to the shock absorber strut. The landing gear may comprise a plurality of wheels mounted to the bogie.

The landing gear and hydraulic actuator may be arranged such that retraction of the hydraulic actuator causes retraction of the landing gear, and extension of the landing gear causes extension of the hydraulic actuator. Alternatively, the landing gear and hydraulic actuator may be arranged such that extension of the actuator causes retraction of the landing gear, and extension of the landing gear causes retraction of the actuator. There may be a mechanical linkage to transfer movement between the hydraulic actuator and the landing gear.

The landing gear may be arranged to extend at a rate that causes the piston to move in the second direction at a rate that increases the volume of the second chamber faster than the volume of the second chamber can be refilled with hydraulic fluid, for example from the first chamber. The pressure in the second chamber may thereby drop towards a vacuum during landing gear extension.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine, preferably a plurality of engines, for propelling the aircraft. The aircraft may comprise wing-mounted, and preferably underwing, engines.

The present invention provides, according to a third aspect, a method of moving an aircraft component in an aircraft according to the second aspect of the invention, the method comprising the steps of: configuring the hydraulic actuation system into the first mode of operation, supplying pressurised hydraulic fluid from the supply line into the first chamber so as to move the component from a first position to a second position under the action of the hydraulic actuator; and configuring the hydraulic actuation system into the second mode of operation and allowing the component to move under an under an external force from the second position to a first position.

The present invention provides, according to a fourth aspect, an aircraft landing gear extension and retraction system comprising: a supply line arranged to carry hydraulic fluid pressurised by a pump, a return line arranged to return hydraulic fluid to a reservoir, and a hydraulic landing gear retraction actuator for connection to a landing gear, the actuator comprising a first chamber and a second chamber separated by a piston, wherein the piston is moved during extension and retraction of the landing gear; the landing gear extension and retraction system is operable in a first mode so as to retract the landing gear, wherein in the first mode the first chamber is supplied with pressurised hydraulic fluid from the supply line such that the piston is urged in a direction that causes the aircraft landing gear to be urged towards the retracted position; and the landing gear extension and retraction system is operable in a second mode so as to allow the landing gear to extend, wherein in the second mode the first chamber is taken out of fluid communication with the supply line and the second chamber is in fluid communication with the return line such that the piston is able to move in a direction that allows the landing gear to extend under gravity.

The aircraft landing gear extension and retraction system may further comprise an up-lock arranged to lock the landing gear in a retracted position. The aircraft landing gear extension and retraction system may further comprise a down-lock arranged to lock the landing gear in an extended position. The up-lock and/or down-lock may comprise a hydraulic actuator.

The present invention provides, according to a fifth aspect, a method of extending a landing gear of an aircraft, the aircraft comprising an aircraft landing gear extension and retraction system according to the fourth aspect of the invention, the method comprising the steps of: configuring the landing gear extension and retraction system into the second mode of operation, unlocking the landing gear from the retracted position, allowing the landing gear to extend under gravity, and locking the landing gear in its extended position. The landing gear may be locked in the retracted position by the up-lock. The landing gear may be locked in the fully extended position by the down-lock. The method may comprise a step of filling the first chamber with hydraulic fluid from the second chamber.

The present invention may provide, according to a sixth aspect, an aircraft hydraulic actuation system comprising: a hydraulic actuator, for example for retraction of a landing gear, the hydraulic actuator comprising a first chamber and a second chamber separated by a piston; wherein there is a fluid flow path between the first chamber and the second chamber that is open for the flow of hydraulic fluid from the first chamber to the second chamber when the piston is moved in a first direction.

It will of course be appreciated that features described in relation to one aspect of the present invention may be incorporated into other aspects of the present invention. For example, the aircraft landing gear extension and retraction system of the fourth aspect may contain any of the features described in relation to the aircraft hydraulic actuation system of the first aspect, and the method of the invention may incorporate any of the features described with reference to the apparatus of the invention and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which:

FIG. 3a shows the actuator retracting and FIG. 3b shows the actuator extending;

FIG. 4a shows the actuator retracting and FIG. 4b shows the actuator extending;

FIG. 8*a* shows the actuator retracting and FIG. 8*b* shows the actuator extending;

DETAILED DESCRIPTION

Figure 1:
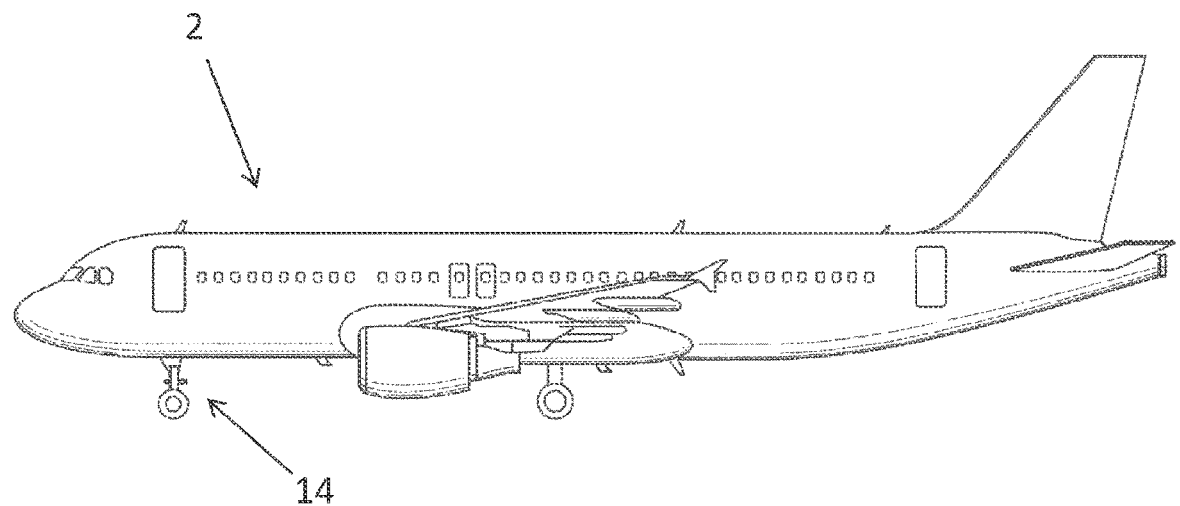
FIG. 1 shows a side view of an aircraft comprising a landing gear.
Figure 2:
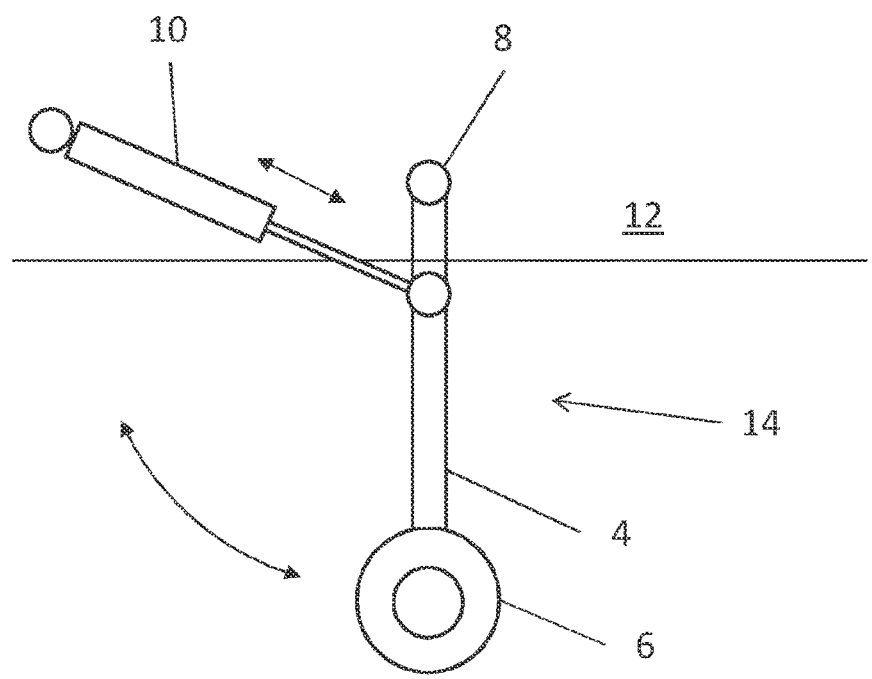
FIG. 2 shows a side view of a landing gear and example arrangement for retracting and extending the landing gear.
Figure 3A:
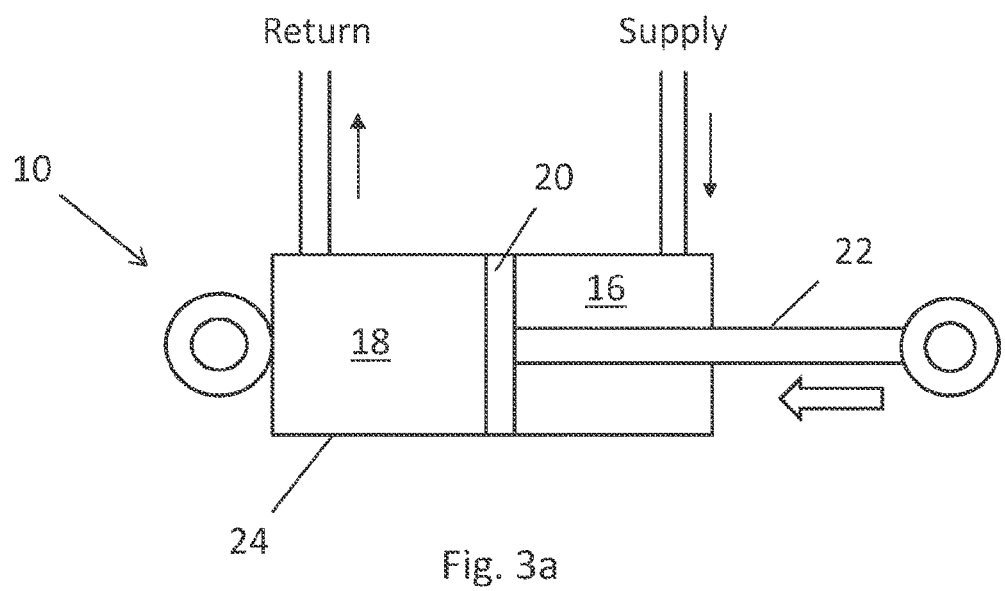
FIGS. 3a and 3b show a first prior art hydraulic actuator and the connections thereto.
Figure 3B:
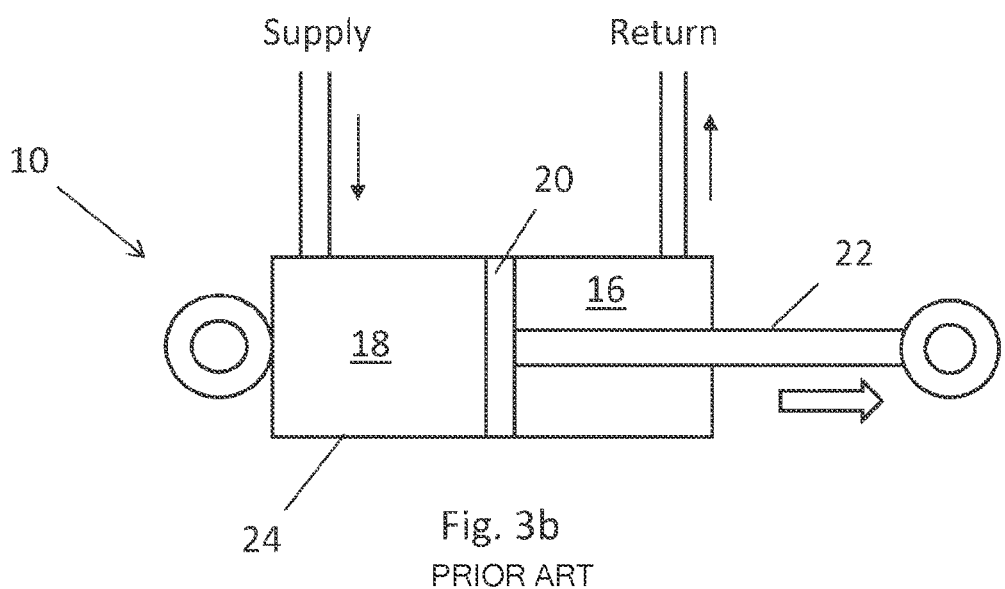
Figure 4A:
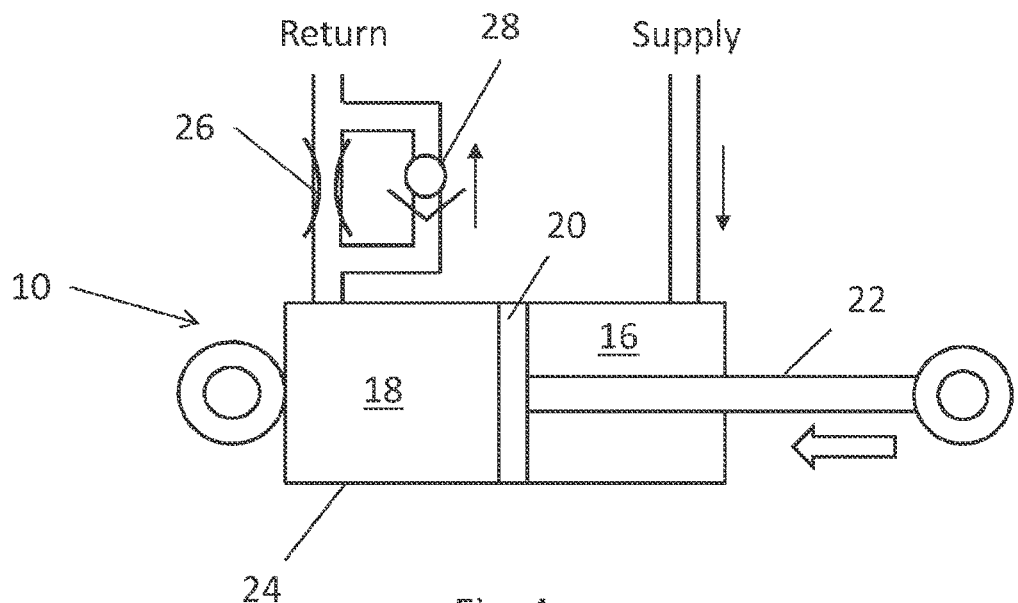
FIGS. 4a and 4b show a second prior art hydraulic actuator and the connections thereto.
Figure 4B:
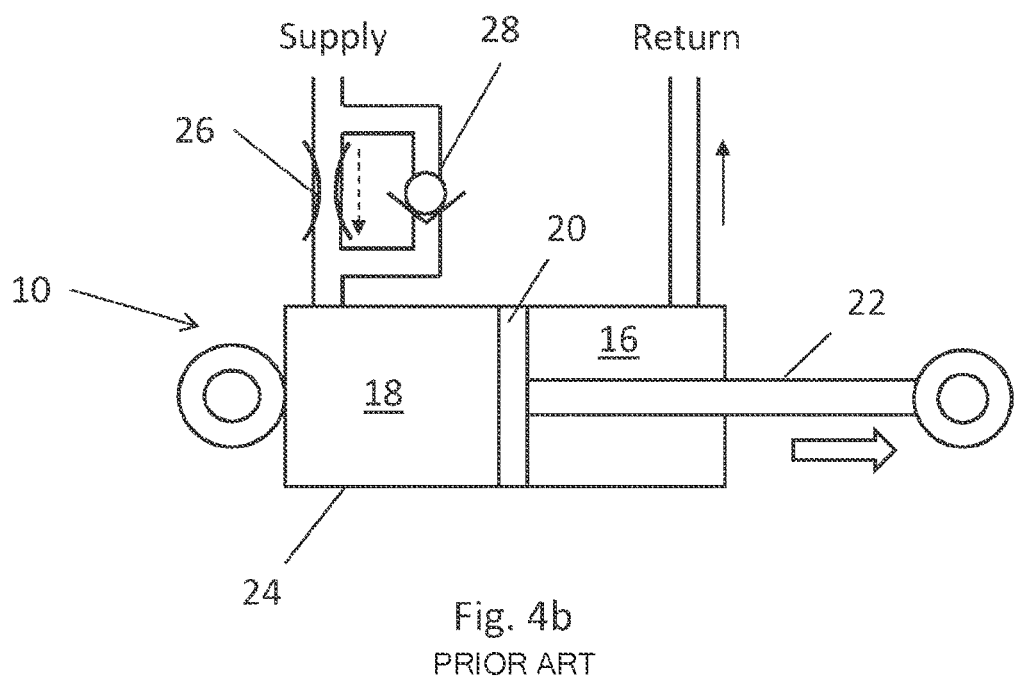
Figure 5:
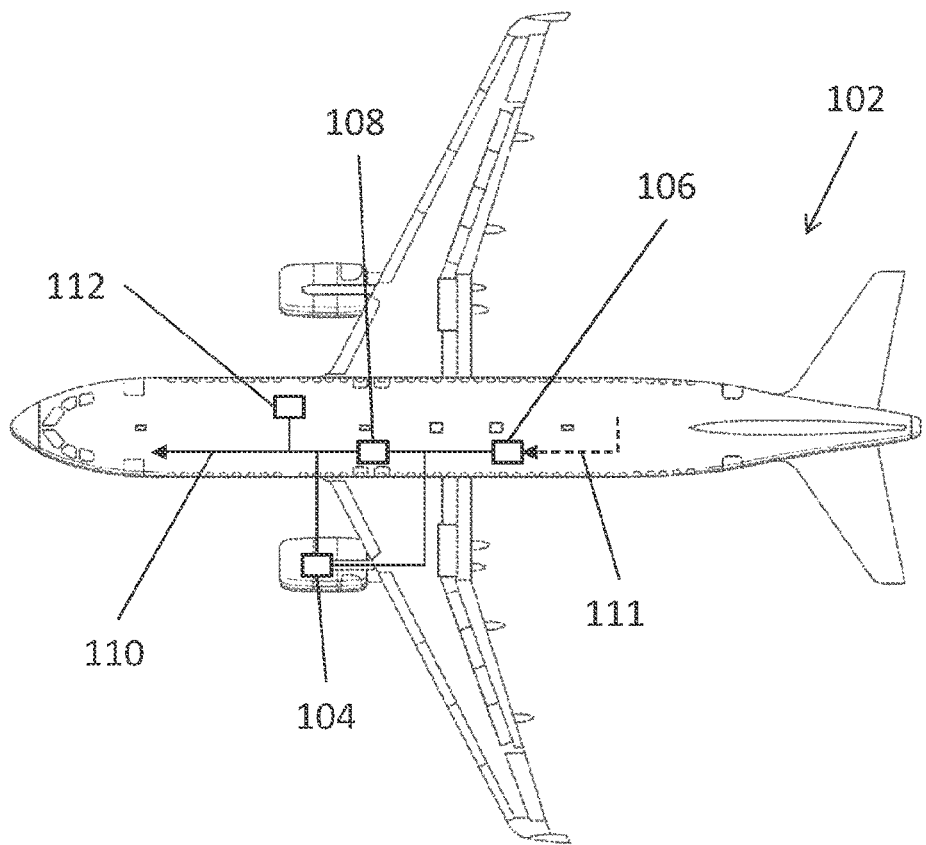
FIG. 5 shows a plan view of an aircraft according to a first embodiment of the invention.
Figure 6:
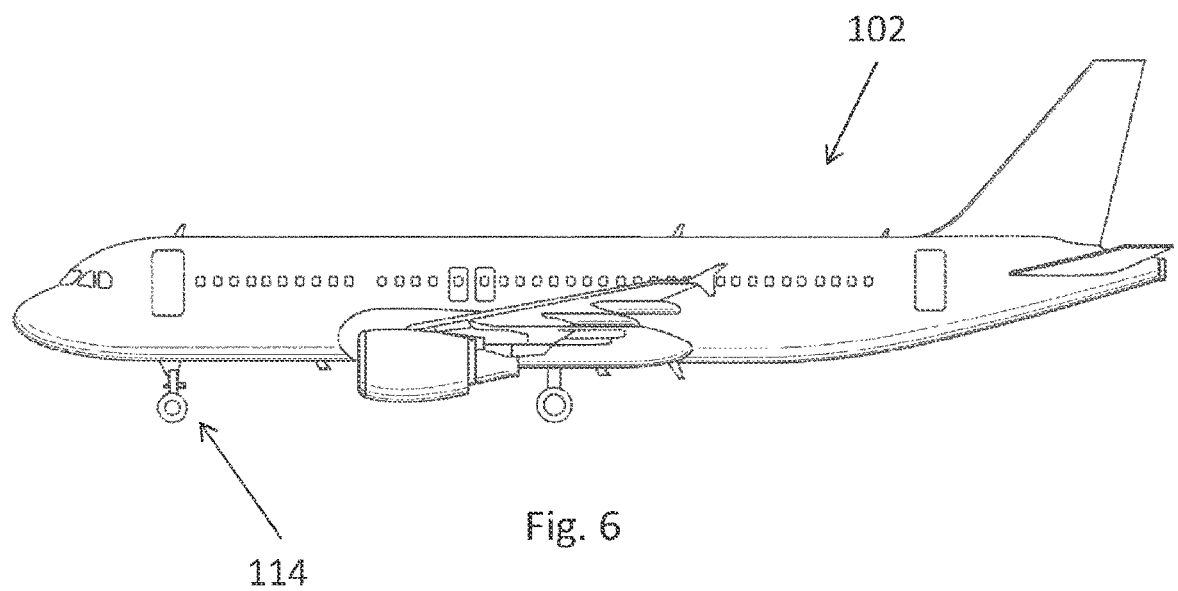
FIG. 6 shows a side view of an aircraft according to a first embodiment of the invention.

FIGS. 5 and 6 show an aircraft 102 according to a first embodiment of the invention. The aircraft 102 comprises a hydraulic actuation system comprising an engine driven pump 104 arranged to pressurize hydraulic fluid to a supply pressure of 200 Bar. The engine driven pump 104 is supplied with hydraulic fluid from a reservoir 106. A backup electric pump 108 is provided in parallel to the engine driven pump 104 to pressurize the hydraulic fluid in the hydraulic system in the event that the engine driven pump 104 cannot operate. In alternative embodiments, only an electric pump or pumps are provided.

A hydraulic fluid supply line 110 extends from the pumps 104, 108 and carries the pressurised hydraulic fluid to various actuators in the aircraft 102, for example, actuators associated with flight control surfaces, brakes and landing gear retraction. The hydraulic actuation system further comprises an accumulator 112 that feeds into the supply line 110 downstream of the hydraulic pumps 104, 108. A return line 111 returns hydraulic fluid to the reservoir. The pressure of hydraulic fluid in the return line 111 is approximately 5 to 10 Bar.

Figure 7:
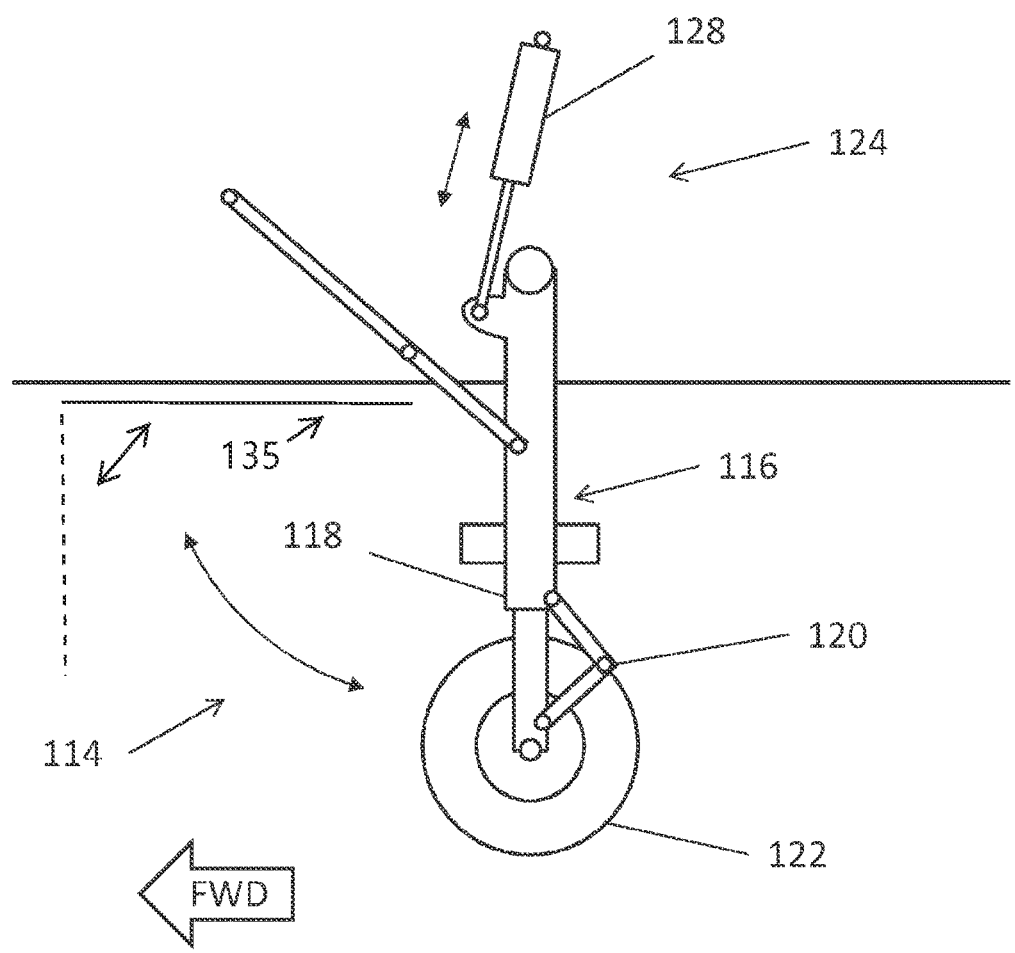
FIG. 7 shows a landing gear and a landing gear extension and retraction system according to a first embodiment of the invention.

The aircraft 102 further comprises a landing gear 114. As shown in FIG. 7, the landing gear 114 comprises a landing gear leg 116 comprising a shock absorber 118 and a torque link 120, a set of wheels 122 are mounted to the bottom of the leg 116. In alternative embodiments, the landing gear may comprise a bogie pivotally mounted to the landing gear leg, the bogie comprising a plurality of sets of wheels.

A landing gear extension and retraction system 124 is coupled to the landing gear 114. The landing gear extension and retraction system 124 comprises various components that also form part of the aircraft's hydraulic actuation system, including a hydraulic actuator 128 associated with extension and retraction of the landing gear 114. The landing gear extension and retraction system 124 also comprises a landing gear up-lock mechanism and a landing gear down-lock mechanism (not shown), which each comprise their own hydraulic actuators.

Figure 8A:
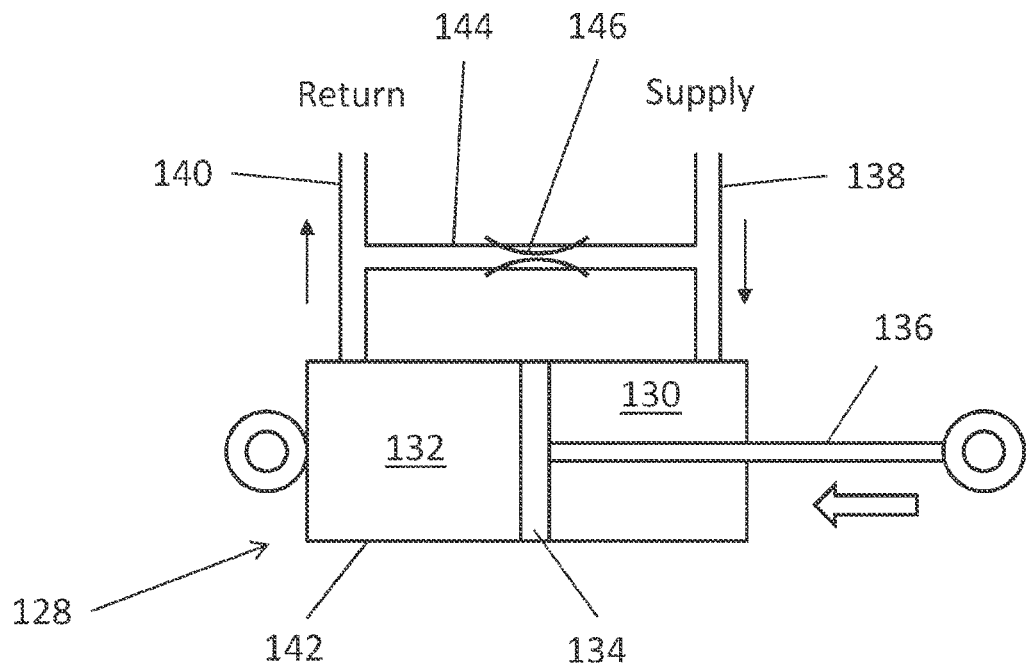
FIGS. 8*a* and 8*b* show a hydraulic actuator and connections thereto according to a first embodiment of the invention.
Figure 8B:
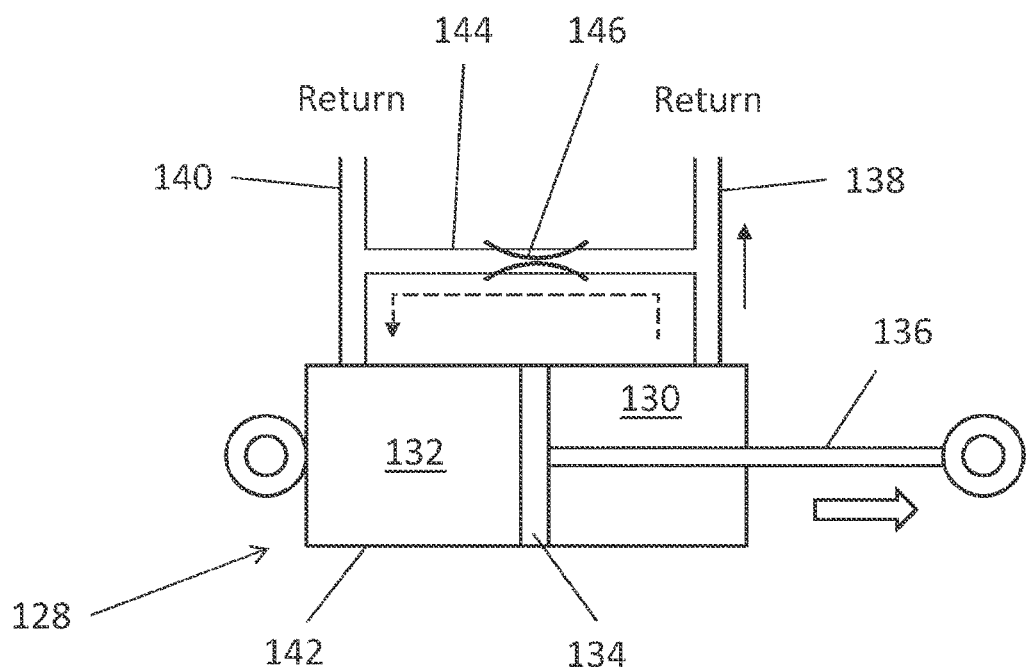

FIGS. 8*a* and 8*b* show the hydraulic actuator 128 and its associated hydraulic connections in further detail. The hydraulic actuator 128 comprises a housing 142 containing a first chamber 130 and a second chamber 132 separated by a piston 134. The piston 134 is attached to a piston rod 136, the free end of which is pivotally mounted to the landing gear leg 116. The end of the housing 142 that is distal from the free end of the piston rod 136 is pivotally mounted to a structural part of the aircraft 102.

A first hydraulic line 138 feeds into the first chamber 130 and a second hydraulic line 140 feeds into the second chamber 132. The first hydraulic line 138 is in fluid communication with the second hydraulic line 140 via a third hydraulic line 144 which creates a flow path between the first chamber 130 and the second chamber 132. A flow restrictor 146 in the third hydraulic line 144 restricts the rate at which hydraulic fluid can flow through the third hydraulic line 144.

The hydraulic actuation system has a first mode of operation (FIG. 8*a*) for retraction of the landing gear 114. In the first mode of operation, a selector valve places the first hydraulic line 138, and therefore the first chamber 130, into fluid communication with the supply line 110. Pressurized hydraulic fluid can thereby be supplied into the first chamber 130. The second hydraulic line 140, and therefore the second chamber 132, is in fluid communication with the return line 111. Hydraulic fluid can thereby exit the second chamber 132 and may return to the reservoir 106.

In use, in the first mode, the difference between the hydraulic pressure in the supply line 110 and the hydraulic pressure in the return line 111 causes the piston 134 to be urged in a direction which retracts the piston rod 136 into the housing 142. The overall length of the actuator 128 is thereby reduced and the landing gear 114 is retracted. The presence of the hydraulic line 144 causes some hydraulic fluid to pass directly from the supply to the return. The flow restrictor 146 is selected such that the rate of fluid flow has no impact on the effective operation of the actuator 128 when retracting the landing gear 114.

The hydraulic actuation system has a second mode of operation (FIG. 8*b*) for extension of the landing gear 114. In the second mode of operation, the selector valve places the first hydraulic line 138, and therefore the first chamber 130, into fluid communication with the return line 111. Hydraulic fluid can thereby exit the first chamber 130 and may return to the reservoir 106. The second hydraulic line 140, and therefore the second chamber 132, is also in fluid communication with the return line 111.

When the hydraulic actuation system is in the second mode of operation, and the system in a substantially static state, the hydraulic pressure in the first chamber 130 and the second chamber 132 is substantially the same. The piston 134 is thereby not urged in any particular direction by hydraulic pressure.

When the landing gear is allowed to extend by disengagement of the up-lock and opening of the landing gear doors 135, the weight of the landing gear is such that it drops under gravity. The landing gear is also arranged such that, in flight, drag caused by the flow of air over the landing gear also urges the landing gear towards an extended position. As the landing gear extends, the piston rod 136 is pulled out from the housing 142 and the piston 134 is moved in a direction that reduces the volume of the first chamber 130 and increases the volume of the second chamber 132.

Downstream of the actuator 128, the return line 111 comprises a check valve (not shown) to ensure one way flow towards the reservoir 106, therefore very little, if any, hydraulic fluid is able flow back down the return line 111 so as to fill the second chamber 132. Instead, the second chamber 132 is filled, via the hydraulic line 144, by hydraulic fluid from the first chamber 130 and by hydraulic fluid from other hydraulic elements of the landing gear extension and retraction system 124.

The flow restrictor 146 is selected to allow a relatively low rate of fluid flow so that the fluid flow through the third hydraulic line 144 does not to have a negative impact on the ability of the hydraulic system to pressurize the first chamber 130 on retraction of the landing gear 114. As a consequence, during extension of the landing gear 114, the volume of fluid flowing through the flow restrictor 146 is insufficient to fill the increasing size of the second chamber 132. Therefore, as the landing gear 114 extends, the pressure in the second chamber 132 drops towards a vacuum.

When the landing gear 114 has reached full extension, the down-lock is engaged to lock the landing gear 114 in its fully extended position and the pressure in the second chamber slowly increases as it is filled via the hydraulic line 144. As the second chamber 132 is not in fluid communication with the supply line 110, the actuator 128 does not transfer high loads into the aircraft structure, landing gear 114 and associated attachment points at full extension.

Figure 9:
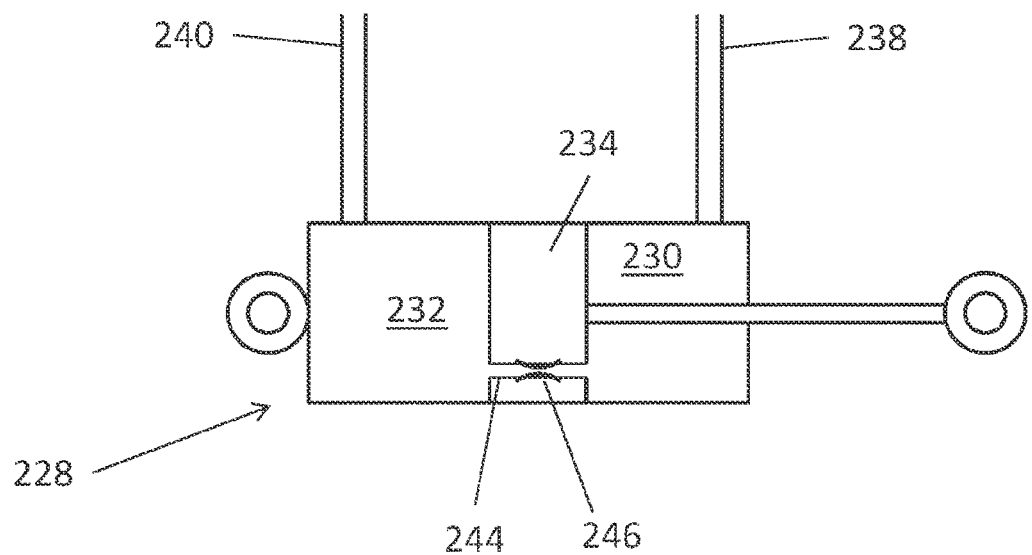
FIG. 9 shows a hydraulic actuator according to a second embodiment of the invention.

FIG. 9 shows a hydraulic actuator of a hydraulic actuation system according to a second embodiment of the invention. In the second embodiment of the invention, the first hydraulic line 238 and the second hydraulic line 240, that feed straight into the first and second chambers 230, 232 of the actuator 228, are not directly linked via a third hydraulic line. Instead, the piston 234 comprises a through-hole 244 that provides a flow path between the first chamber 230 and the second chamber 232. A flow restrictor 246 is located in the though-hole 244 so as to restrict the rate at which hydraulic fluid can flow between the first chamber 230 and the second chamber 232. In alternative embodiments, the through-hole is sized (e.g. during manufacture) so as to restrict the rate of flow through the through-hole 244 to the required level.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In an alternative embodiment of the invention, the flow restrictor in the hydraulic line between the first hydraulic line and the second hydraulic line is replaced by a valve arranged to selectively close the flow path between the first chamber and the second chamber. The valve is closed when the hydraulic actuation system is in the first mode, and opened when the hydraulic actuation system is in the second mode. In embodiments, operation of the valve is computer controlled.

In an alternative embodiment of the invention, the aircraft hydraulic actuation system is arranged such that in the first mode of operation the piston is urged in a direction that extends the length of the actuator. This may, for example, be achieved by swapping around the various supply line and return line connections that feed into the actuator. Corresponding changes may need to be made to the linkages in the landing gear extension and retraction system such that extension of the actuator results in retraction of the landing gear.

In an alternative embodiment of the invention, the actuator comprises a housing comprising a first and a second internal hydraulic line formed in the housing. Each internal hydraulic line extends from an input/output port to a chamber of the actuator. The input/output ports are arranged for connection to an external hydraulic line. A third internal hydraulic line provides a hydraulic fluid flow path between the first internal hydraulic line and the second internal hydraulic line.

It is envisaged that the present invention may have non-aircraft applications. References in the description and claims to aircraft hydraulic actuation systems could be replaced by references to hydraulic actuation systems in the general sense.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft hydraulic actuation system comprising:
a supply line arranged to carry hydraulic fluid pressurized by a pump,
a return line arranged to return the hydraulic fluid to a reservoir, and
a hydraulic landing gear retraction actuator comprising a first chamber and a second chamber separated by a piston, wherein the first chamber is fluidly connectable to the supply line, and the second chamber is fluidly connectable to the return line;
wherein the aircraft hydraulic actuation system has a first mode of operation in which the first chamber is supplied with the hydraulic fluid from the supply line such that the piston is moved in a first direction to retract a landing gear; and
wherein the aircraft hydraulic actuation system has a second mode of operation in which the first chamber is taken out of fluid communication with the supply line and the second chamber is in fluid communication with the return line, such that the piston is urged to move in a second direction, opposite to the first direction, as the landing gear extends at least partially due to gravity acting on the landing gear,
wherein any fluid in the first chamber during the second mode of operation is insufficient to move the piston.

2. The aircraft hydraulic actuation system according to claim 1, further comprising a hydraulic fluid flow path between the first chamber and the second chamber such that, in the second mode of operation, the second chamber is filled with the hydraulic fluid from the first chamber.

3. The aircraft hydraulic system according to claim 2, wherein the hydraulic fluid flow path between the first chamber and the second chamber comprises a flow restrictor valve configured to restrict a rate of fluid flow to a predetermined level.

4. The aircraft hydraulic actuation system according to claim 2, wherein the aircraft hydraulic actuation system comprises a first hydraulic line feeding into the first chamber, a second hydraulic line feeding into the second chamber, and a third hydraulic line connecting the first hydraulic line and the second hydraulic line, wherein the third hydraulic line is configured to provide the hydraulic fluid flow path between the first chamber and the second chamber.

5. The aircraft hydraulic actuation system according to claim 4, wherein the third hydraulic line is separate from the landing gear hydraulic retraction actuator.

6. The aircraft hydraulic actuation system according to claim 2, wherein the hydraulic fluid flow path between the first chamber and the second chamber is within the piston.

7. The aircraft hydraulic actuation system according to claim 1, wherein the hydraulic actuation system is arranged such that the supply line is arranged to supply the hydraulic fluid at a pressure of 100 Bar or greater.

8. The aircraft hydraulic actuation system according to claim 1, wherein the hydraulic actuation system is arranged such that the hydraulic fluid in the return line has a pressure of 10 Bar or less.

9. The aircraft hydraulic actuation system according to claim 1, wherein the pump is driven by an aircraft engine.

10. The aircraft hydraulic actuation system according to claim 1, wherein the pump is arranged to draw the hydraulic fluid from the reservoir.

11. An aircraft comprising the aircraft hydraulic actuation system according to claim 1.

12. The aircraft according to claim 1, wherein the aircraft hydraulic actuation system is configured to be in the first mode for retraction of the aircraft landing gear and configured to be in the second mode for extension of the aircraft landing gear.

13. The aircraft according to claim 1, wherein the aircraft component is an aircraft door.

14. The aircraft hydraulic actuation system according to claim 1, wherein the hydraulic landing gear retraction actuator is configured to be attached to a first position fixed relative to a fuselage of an aircraft, the piston is configured to be attached to an aircraft landing gear of the aircraft and the landing gear is pivotably connected to a second position fixed relative to the fuselage separate from the first position.

15. A method of moving a landing gear in an aircraft using an aircraft landing gear extension and retraction system that includes a supply line arranged to carry hydraulic fluid pressurized by a pump, a return line arranged to return hydraulic fluid to a reservoir, and a hydraulic landing gear retraction actuator configured to be connected to a first position fixed relative to a fuselage of the aircraft, wherein the actuator includes a first chamber and a second chamber separated by a piston configured to be connected to the landing gear,
the method comprising:
operating the landing gear extension and retraction system in a first mode to retract the landing gear, wherein the first mode includes supplying the first chamber with hydraulic fluid from the supply line to move the piston in a direction to retract the landing gear; and
operating the landing gear extension and retraction system in a second mode to extend the landing gear, wherein the second mode includes isolating the first chamber from fluid communication with the supply line while the second chamber is in fluid communication with the return line such that the piston moves in a direction that allows the landing gear to extend by gravity acting on the landing gear,
wherein the landing gear pivots about a second position, separate from the first position, fixed relative to the fuselage.

16. An aircraft landing gear extension and retraction system comprising:
a supply line arranged to carry hydraulic fluid pressurized by a pump,
a return line arranged to return hydraulic fluid to a reservoir, and
a hydraulic landing gear retraction actuator comprising a first chamber and a second chamber separated by a piston configured to be attached to a landing gear of the aircraft, wherein the piston is moved during extension and retraction of the landing gear;
the landing gear extension and retraction system being operable in a first mode to retract the landing gear, wherein in the first mode the first chamber is supplied with the hydraulic fluid from the supply line such that the piston is urged in a direction that causes the aircraft landing gear to be urged towards a retracted position;
the landing gear extension and retraction system being operable in a second mode to allow the landing gear to extend, wherein in the second mode the first chamber is taken out of fluid communication with the supply line and the second chamber is in fluid communication with the return line such that the piston is moved by the landing gear as the landing gear extends at least partially due to gravity,
wherein any fluid in the first chamber during the second mode does not provide a force sufficient to move the piston.

17. A method of extending a landing gear of an aircraft using an aircraft landing gear extension and retraction system that includes a supply line arranged to carry hydraulic fluid pressurized by a pump, a return line arranged to return hydraulic fluid to a reservoir, and a hydraulic landing gear retraction actuator including a first chamber and a second chamber separated by a piston configured to be connected to the landing gear of the aircraft,
the method comprising:
the landing gear extension and retraction system operating in a first mode to retract the landing gear and during the first mode the first chamber is supplied with hydraulic fluid from the supply line to urge the piston in a first direction that causes the landing gear to retract;
the landing gear extension and retraction system operating in a second mode to extend the landing gear and during the second mode the first chamber is isolated from fluid communication with the supply line and the second chamber is in fluid communication with the return line such that the piston moves in a second direction, opposite the first direction, due to the force of gravity acting on the landing gear to extend the landing gear; and
configuring the landing gear extension and retraction system into the second mode of operation by
unlocking the landing gear from the retracted position; allowing the landing gear to extend under gravity; and locking the landing gear in an extended position.

18. The method according to claim 17, further comprising a step of refilling the first chamber with hydraulic fluid from the second chamber.

* * * * *